Patented June 19, 1923.

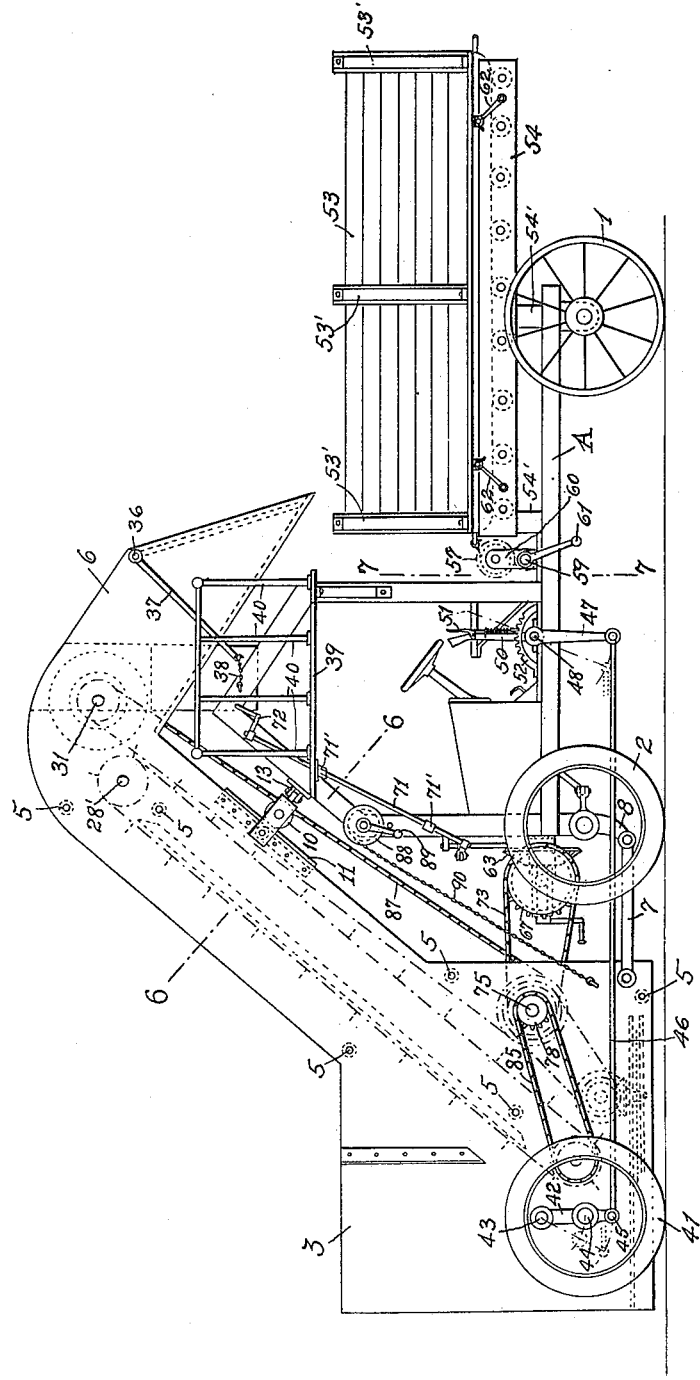

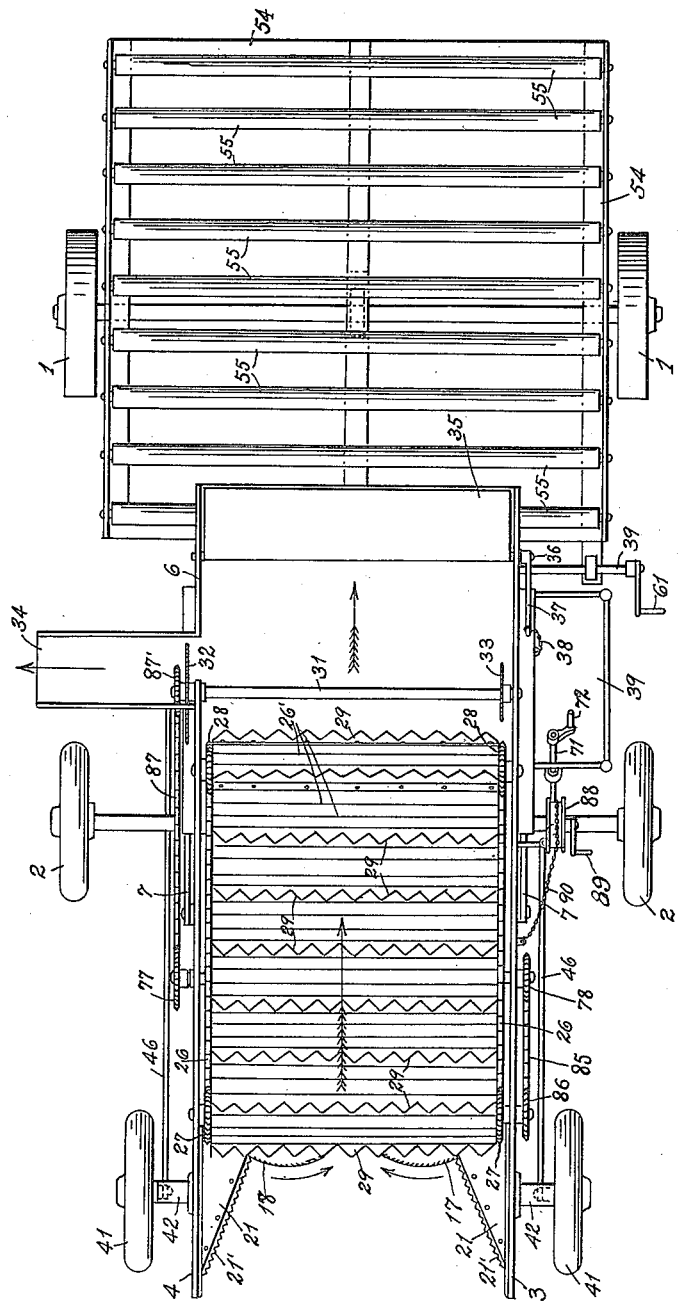

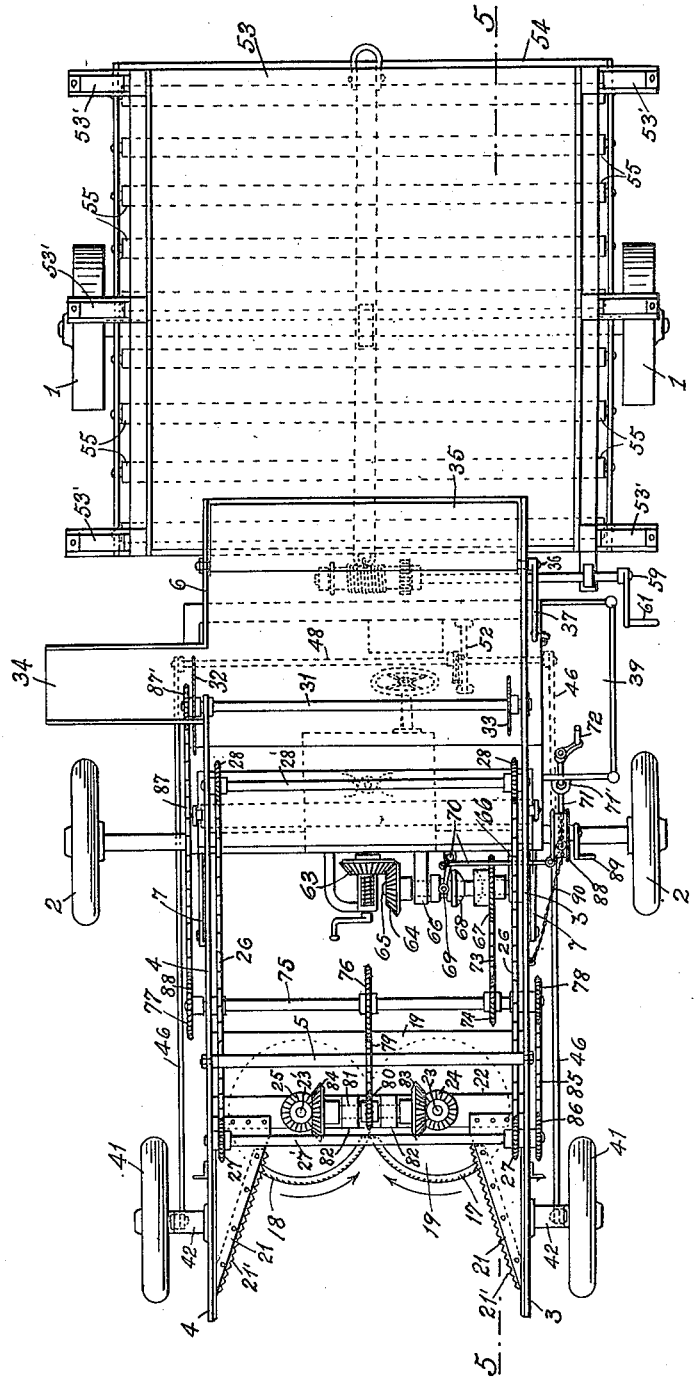

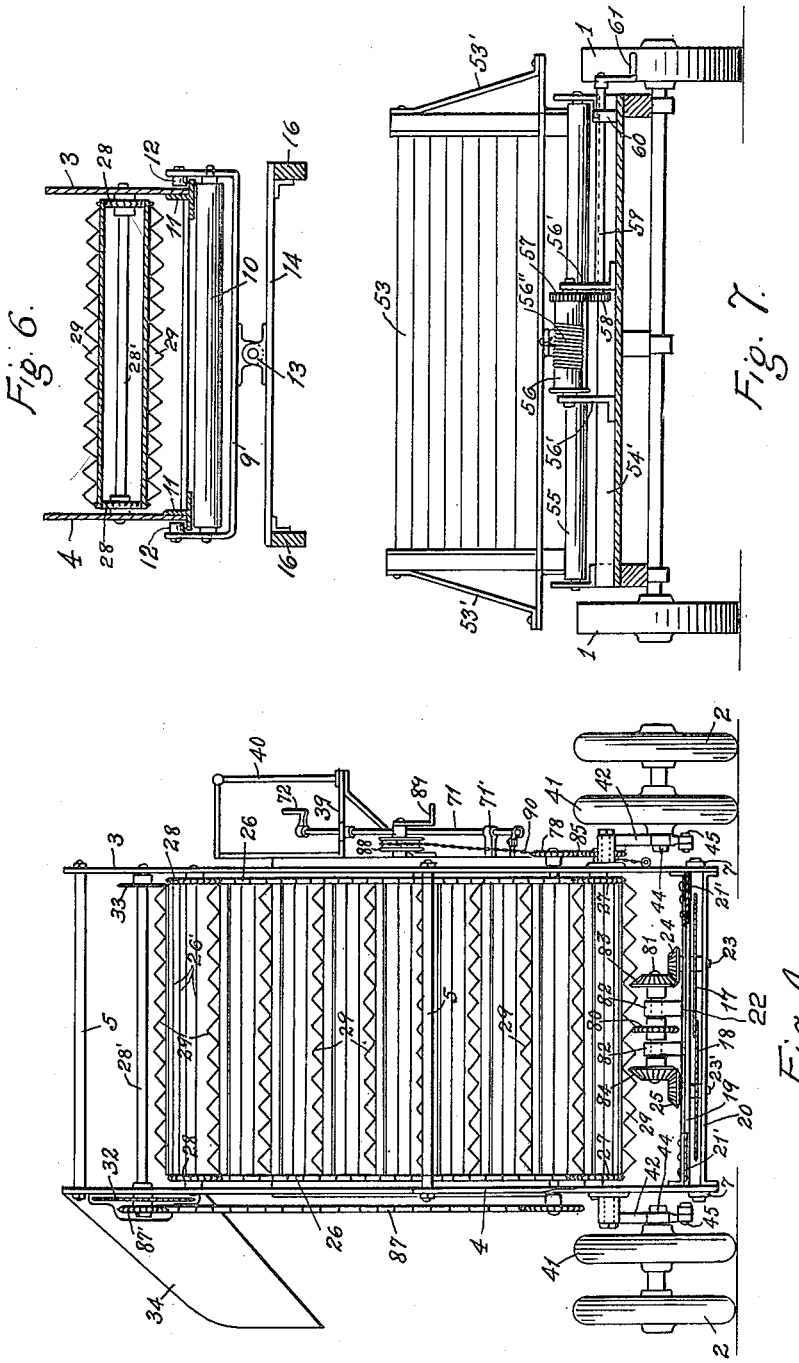

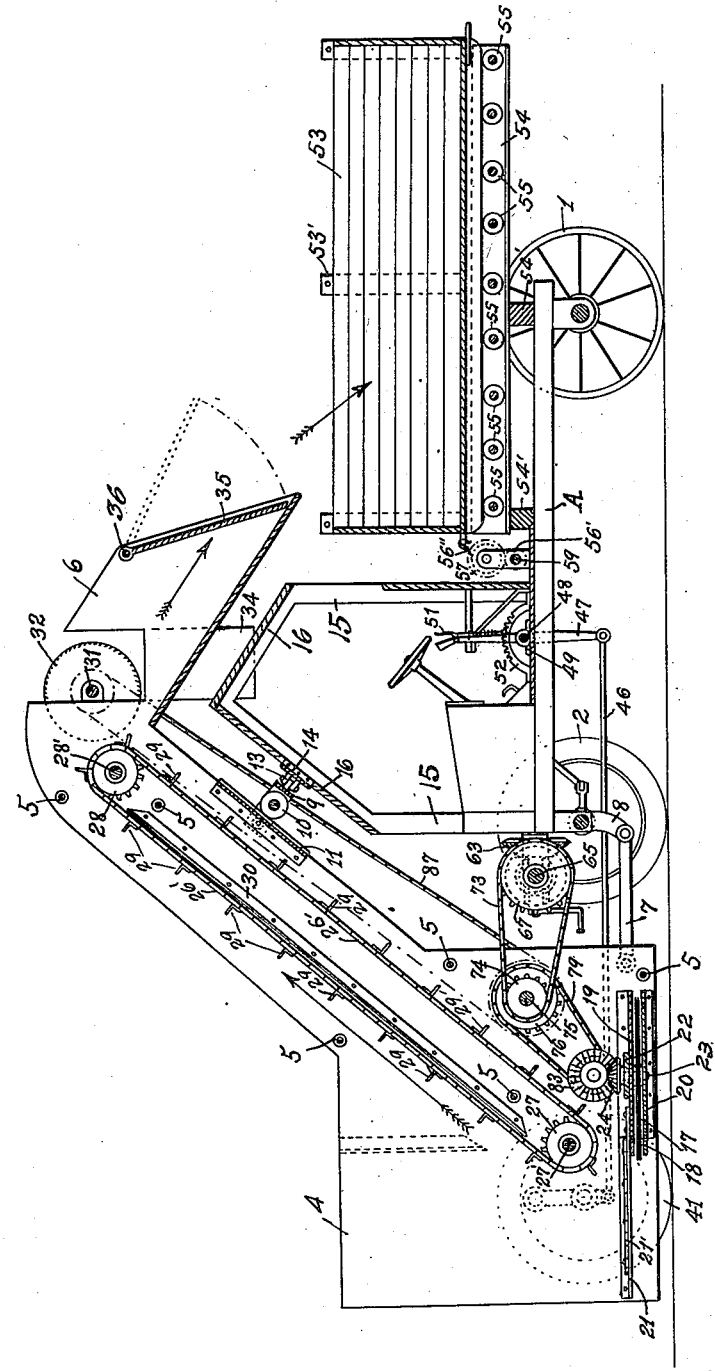

1,459,247

UNITED STATES PATENT OFFICE.

JOSÉ VILAR y PAZOS, OF TRINIDAD, CUBA.

MACHINE FOR CUTTING CANE AND SIMILAR PLANTS.

Application filed February 18, 1922. Serial No. 537,465.

*To all whom it may concern:*

Be it known that I, José Vilar y Pazos, a citizen of the Republic of Cuba, and resident of Trinidad, Province of Santa Clara, Cuba, have invented certain new and useful Improvements in Machines for Cutting Cane and Similar Plants, of which the following is a specification.

This invention relates to the cutting of cane and particularly of sugar cane and similar plants, and its main object is to provide a machine for effecting the cutting of the sugar cane by means of mechanically operated knives which cut the cane at their foot on the field; which machine comprises also means for taking up the cut cane to a discharge chute arranged at a higher plane. where it is received by an operator who tops it off using knives mechanically operated by the same machine and then cuts the topped cane in the desired pieces, the machine being also provided with a receptacle where the pieces of cane are deposited.

The invention is described with reference to the figures of the annexed drawings, in which:

Fig. 1 is a side elevation of the machine for cutting cane and similar plants which forms the subject matter of this invention.

Fig. 2 is an upper plan view of the same.

Fig. 3 is an upper plan view of the machine, some parts being taken away to better illustrate the various mechanisms.

Fig. 4 is a front end elevation of the machine.

Fig. 5 is a longitudinal vertical section of the machine on line 5—5 of Fig. 3.

Fig. 6 is a detailed vertical section on line 6—6 of Fig. 1, and

Fig. 7 is a vertical section on line 7—7 of Fig. 1.

This machine comprises a driving mechanism which in the present illustration consists in a truck A of any commercial type, its frame being mounted on rear wheels 1 without rubber tire and guiding wheels 2 with rubber tires.

At the front part of truck A is mounted a frame supporting the mechanism for cutting the cane at its foot, the means for taking up the same and the topping and cutting mechanisms. Said frame comprises two vertical plates 3 and 4 arranged parallel and spaced apart from each other at each side of truck A in front of same, being rigidly secured together by means of cross bars 5 the outline of said plate, being that illustrated in Figs. 2 and 5, that is of rectangular shape at its lower part, said plates extending upwards in diagonal direction to its lower part and extending then downwards to form the sides of a chute for discharging the cane, terminating in slanting edges. Plates 3 and 4 are movable and their height from the ground is regulated, there being articulated at the rear lower part of said plates at the exterior thereof horizontal arms 7 pivoted on pending supports 8 secured below the front part of the truck frame. Plates 3 and 4 bear at its narrower portion on an articulated swinging support formed by a bearing 9 transversely arranged to plates 3 and 4 and on which is mounted a horizontal loose pulley or roller 10 on which bear the lower edges of the plates 3 and 4 through the intermediary of T-plates 11 one of whose wings projects outwardly to be held by rollers 12 loosely mounted on trunnions fixed to the inner faces of the sides of the bearing 9. Bearing 9 is pivotally mounted by means of an articulation 13 on a transverse plate 14 which connects inclined beams 16 which are supported by posts 15.

Between the rectangular portions of plates 3 and 4 and adjacent their lower edges are arranged the knives for cutting the cane at its foot, which knives consist of two circular saws 17 and 18 arranged one immediately below the other so that their edges slightly overlap each other, said knives being guarded by plates 19 and 20 terminating in upwardly and downwardly leading flanges respectively riveted to the inner faces of plates 3 and 4 and arranged above and below the knives, covering the rear half of the same and presenting at its front edge two semicircular shoulders permitting the projection of the serrated edges of the knives out of said shoulders. In front of these plates, in the same alinement, there are secured to plates 3 and 4 two plates 21 of triangular form which extend forwardly terminating near the front edge of plates 3 and 4. On the outer edges of these plates 21 are riveted serrated plates 21' which constitute stationary knives. On plate 19 there is arranged a narrow transverse plate 22. Short vertical shafts 23 and 23' centrally fixed to the knives 17 and 18, are mounted in bearings in the plates 19, 20 and 22 there being fixed on the upper ends of said shafts bevel pinions 24 and 25 which receive motion from the general driving system which will be hereinafter described.

Plates 3 and 4 serve also as sides to an endless inclined conveyor formed by endless chains 26 adjacent the inner face of each plate and which chains are mounted on lower sprocket wheels 27 and upper ones 28 secured to horizontal shafts 27' and 28' mounted between plates 3 and 4, said chains being connected by slabs 26' to which are fixed spaced apart angular plates 29 with one of its wings upwardly directed and serrated at its edges so as to form a securing surface, the upper part of the conveyer bearing on the horizontal flanges of angular plates 30 longitudinally secured to the inner face of plates 3 and 4.

At the upper part of the discharge chute 6 there is a horizontal shaft 31 rotatably mounted between the sides of the said chute there being secured to this shaft, exteriorly to the said chute a topping circular saw 32, and interiorly to the chute near the opposite plate 3 is secured a cane cutting circular saw 33 which is of less diameter than the saw 32. The said chute is in communication with a side chute 34 outwardly inclined and arranged below the topping saw 32 and the outlet end of the chute 6 is closed by a door 35 articulated at its upper part to a horizontal shaft 36 operated by a lever 37 fixed to one of its ends and which is kept in position by means of a chain 38 fixed to one of the beams 16.

The operator can have access to the mechanism and can watch the discharge of the cane down the chute from a platform 39 secured to a side of the front frame of the truck and which platform is provided with a railing 40 for safety of the operator.

The frame bearing the cutting, transporting, topping and sectioning mechanisms can have a limited vertical motion with the object of regulating the height of the cutting knives in its operation, resting at its front part for that purpose on two wheels 41 provided with rubber tires and which loosely rotate on short shafts projecting outwardly at each side of the lower portion of plates 3 and 4, there being fixed to the shafts of said wheels levers 42 pivoted at one end to a trunnion 43 projecting from the outer face of each one of the plates 3 and 4 and fixed at 44 to the shaft of the wheels 41 and at its lower end 45 the levers are pivoted on horizontal bars 46 whose opposite ends are pivoted to arms 47 fixed to a horizontal shaft 48 pivotally mounted in bearings 49 secured on the side beams of the frame of truck A. This shaft has fixed thereto a vertical lever 50 pivotally carrying a vertical rod 51 terminating in a ratchet pawl by which it is connected with a vertical toothed sector 52 secured between one of the side beams of the truck adjacent one of the standards between which the shaft 48 rotates.

At the rear part of the truck is arranged the receiver of the cut cane, which consists in a receptacle reinforced with rod ties 53'. Said receptacle slidably bears on a bed 54 fixed by means of cross ties 54' on the rear part of the truck frame A there being transversely arranged loose rollers 55 which directly receive the receptacle 53 which accordingly can have a sliding motion on the same. This movement is regulated by means of a cable 56" tied to a head of the box and coiled in a horizontal coiling drum 56 supported by standards 56' fixed on the frame of the truck A, this drum receiving its motion by means of a gear wheel 57 wedged therein and which meshes with a pinion 58 fixed to the lower end of a horizontal shaft 59 rotatably mounted in standards 56' and 60 and there being fixed at the opposite end of this shaft a crank 61. The receptacle can be fixed on the rollers 55 by means of connections 62.

The driving means for the various mechanism described are the ones that will be immediately described: Exteriorly to truck A there is coupled to its motor a pinion 63 which meshes at right angle with a pinion 64 which is mounted on a horizontal shaft 65 rotating between supporting arms 66 secured to the front part of the truck. On shaft 65 is loosely mounted a sprocket wheel 67 which can be jointly rotated with the shaft by means of a friction clutch 68 whose fork 69 is actuated by means of a connecting system connected to a vertical rod 71 mounted between supporting arms 71' and provided at its upper end with a handle 72 within reach of the operator on the platform 39. The sprocket wheel 67 by means of a chain transmission 73 communicates its motion to a sprocket wheel 74 mounted on a horizontal shaft 75 transversely rotating between plates 3 and 4 of the front frame of the truck, there being mounted on said shaft centrally another sprocket wheel 76 and on the ends which project out of plates 3 and 4 there are mounted sprocket wheels 77 and 78. The sprocket wheel 76 has a chain transmission 79 with a sprocket wheel 80 fixed to a horizontal shaft 81 rotating between standards 82 longitudinally secured on plate 22 there being mounted on the ends of this shaft the bevel pinions 83 and 84 which mesh with the pinions 24 and 25 fixed to the upper ends of the vertical shafts of the cutting knives 17 and 18. The sprocket wheel 78 transmits its motion through a chain transmission 85 to a sprocket wheel 86 fixed on one of the ends of shaft 27' carrying the sprocket wheel 27 of the endless belt and which projects out of plate 3 and the sprocket wheel 77 transmits its motion through a chain 87 to a sprocket wheel 87' secured to shaft 31 which carries the topping knife 32 and the sectioning knife 33 of the cane. In front of the frame fixed in the front part of the truck on one of the front posts 15 of the same is mounted a drum 88 about which is coiled a chain 90 connected at its free end to the lower part of plate 3 and which drum is actuated by a crank 89.

The operation of the machine is as follows: When the motor of truck A is in motion, the bevel pinion 63 transmits its motion to pinion 64, the knives 17 and 18 for cutting the cane near the ground are actuated, as well as the topping saw 32 and the sectioning or severing saw 33 of the cut cane and the conveyor for carrying up the same. The driver of the truck directs the machine towards the sugar plants so that a group of these are caught in open front space between the plates 3 and 4 and between the stationary knives 21' and within reach of the cutting knives 17 and 18. The knives 17 and 18 and knives 21' will coact to cut the canes which will fall towards the conveyor. If the canes are lying down or inclined the knives 17 and 18 and the plates 21' will raise them as the machine travels on the ground, directing them over to the conveyor and at the same time cutting them near the ground In case the canes are scattered and inclined to one or the other side of the path of travel of the machine, the plates 21' will compel them to be placed and arranged in the direction of the travel of the machine so that the knives 17 and 18 may cut them.

Once the canes are on the conveyor the indented plates 29 of the same carry them upwardly and discharge them into the chute 6, the door 35 of which is closed. In this disposition an operator stationed on the platform 39 cuts the canes one at a time and takes off the green tops by means of the topping saw 32, the top falling through the side chute 34 to the exterior of the machine and he also cuts the cane by means of saw 33 in as many pieces or parts as it may be desired. When the canes have been thus cut into pieces, the door 35 is opened by means of the lever 37, the door opening as indicated in dotted lines in Fig. 5 and the cut cane falls into the receptacle 53. When said receptacle is full it can be moved on the rollers 55, by letting loose the cable 56" coiled in the drum 57 which will be operated by means of the crank 61. The height of the cutting knives 17 and 18 can be regulated actuating the lever 50 which will turn the shaft 48 to which are fixed arms 47 connected to bars 46 articulated to wheels 41 which will be caused to ascend or descend, thus raising or lowering the knives as may be required. When the machine is not in operation, the front frame can be raised by winding on the drums 88 the chains 90 fixed at their free ends to plates 3 and 4.

It is obvious that the construction of the different mechanisms can be varied without altering the spirit of the invention which consists in the combination of mechanical means, as set forth in the following claims.

What I claim is:

1. A machine for cutting cane and similar plants, comprising a motor truck; a supporting frame mounted in front of said truck and pivoted thereto; knives for cutting the cane rotatably mounted in the lower part of said frame; stationary knives secured at the inner front part of the frame approximately in the same horizontal plane as the rotatably mounted knives; an endless conveyor in the frame having projecting members for carrying the cut cane, a discharge chute to receive the cut cane; a knife for topping the cut cane and a knife for severing the cut and topped cane when the latter is delivered thereto; a receptacle for the cut cane detachably arranged on the truck below the discharge chute and means for transmitting the power of the motor to the rotatably mounted knives for cutting the cane, to the conveyor for the cut cane and to the topping and severing knives.

2. A machine for cutting cane and similar plants, comprising a motor truck; a frame opened at its front and rear parts and formed by two, vertical parallel plates spaced apart and swingingly mounted in the front part of the truck; two horizontal circular saws rotatably mounted adjacent to one another and one below the other; triangular indented knives horizontally secured at the lower front part of the vertical plates and with the narrower portions projecting forwardly and approximately on the same horizontal plane as the rotatable knives; an endless conveyor arranged between said plates and presenting projecting means for the cut cane a discharge chute inclined towards the bed of the truck and into which the conveyor discharges; a shaft between the sides of the upper part of said chute and having at a point exterior of said chute a topping knife and also having a severing knife for severing the cut and topped cane; a receptacle detachably arranged on the rear part of the truck below the inclined discharge chute; means for moving said receptacle and means for securing the receptacle; means actuating the truck motor to move the knives which cut the cane, the conveyor of the cut cane and the topping and severing knives; means for raising and lowering the knives which cut the cane and means for suspending and securing the swinging frame in inoperative position.

3. A machine for cutting cane and similar plants, comprising a motor truck, a frame swingingly mounted in front of said truck, horizontal circular indented knives mounted in said frame and adapted to cut the cane, triangular indented knives fixed to each side of the frame and arranged in front of the horizontal knives, two wheels mounted in short shafts at each side of the swinging frame, levers on said shafts and each having one end articulated to a side of the frame, bars connected to the said levers, a horizontal shaft rotatably mounted at the front part of the truck and having arms to which said bars are connected to turn said shaft, means to secure said shaft and arms at any desired adjustment, a knife for topping the cut cane, and a knife for severing the cut cane, both mounted on the upper part of the swinging frame, a chute which discharges the cut cane, and a receptacle into which said chute discharges.

In witness whereof I affix my signature.

JOSÉ VILAR y PAZOS.